United States Patent
Held et al.

(10) Patent No.: US 6,848,621 B2
(45) Date of Patent: Feb. 1, 2005

(54) TRANSPONDER UNIT AND TRANSPORT UNIT AND CARD

(75) Inventors: Philippe Held, Corseaux (CH); Egon Konopitzky, Chatel-St-Denis (CH); Martin Miehling, Granges (CH); Reinhard Jurisch, Erfurt (DE); Peter Peitsch, Erfurt (DE)

(73) Assignee: Sokymat S.A., Granges (CH)

( * ) Notice: Subject to any disclaimer, the term of this patent is extended or adjusted under 35 U.S.C. 154(b) by 55 days.

(21) Appl. No.: 10/381,602

(22) PCT Filed: Oct. 4, 2001

(86) PCT No.: PCT/EP01/11464

§ 371 (c)(1),
(2), (4) Date: Apr. 3, 2003

(87) PCT Pub. No.: WO02/029714

PCT Pub. Date: Nov. 4, 2002

(65) Prior Publication Data

US 2004/0069856 A1 Apr. 15, 2004

(30) Foreign Application Priority Data

Oct. 4, 2000 (EP) .............................................. 00810911

(51) Int. Cl.⁷ ............................................... G06K 19/06
(52) U.S. Cl. ........................ 235/492; 235/441; 235/444; 235/451; 235/493
(58) Field of Search ................................ 235/492, 441, 235/444, 451, 493

(56) References Cited

U.S. PATENT DOCUMENTS 4,583,099 A * 4/1986 Reilly et al. ................. 343/895
5,049,856 A * 9/1991 Crossfield ................... 340/551
5,257,009 A * 10/1993 Narlow ..................... 340/572.3
5,581,248 A * 12/1996 Spillman et al. ......... 340/870.31
5,608,417 A * 3/1997 de Vall ....................... 343/895
5,751,256 A * 5/1998 McDonough et al. ....... 343/873
6,072,383 A * 6/2000 Gallagher et al. .......... 340/10.2
6,421,013 B1 * 7/2002 Chung ................. 343/700 MS

FOREIGN PATENT DOCUMENTS

| DE | 196 28 802 | 1/1998 |
| EP | 0 249 356 | 12/1987 |
| EP | 0 762 535 | 3/1997 |
| EP | 1 031 939 | 8/2000 |
| GB | 2 288 103 | 10/1995 |

* cited by examiner

Primary Examiner—Michael G. Lee
Assistant Examiner—Kimberly D. Nguyen
(74) Attorney, Agent, or Firm—Oblon, Spivak, McClelland, Maier & Neustadt, P.C.

(57) ABSTRACT

A transponder unit which can be integrated in a transport unit or a card or the like. The transponder unit includes, in addition to an encapsulated transponder of an integrated circuit, an aerial winding having a resistance $R_A$ and a capacitor parallel thereto and having a capacitance $C_A$. A closed coupling circuit of secondary winding is coupled with the aerial winding by a mutual inductance $M_{SA}$ and a substantially larger primary winding in series with the secondary winding and having fewer turns, for example only one turn. To achieve almost optimum energy transfer between a reading device and the transponder and to increase the permissible reading distance, the mutual inductance $M_{SA}$ is adjusted to comply with the relationship $M_{SA} = \sqrt{[R_A/\omega) (L_P+L_S+2M_{PS})]}$, where $\omega^2=1/(L_A C_A)$ is true for the receiving frequency $\omega$ of the transponder and $L_P$ and $L_S$ are the inductances of the primary winding and of the secondary winding and $M_{PS}$ is their mutual inductance.

10 Claims, 3 Drawing Sheets

TRANSPONDER UNIT AND TRANSPORT
UNIT AND CARD

FIELD OF THE INVENTION

The invention relates to a transponder unit according to the precharacterizing clause of claim 1. Such transponder units are used for identifying in particular objects of different types. In addition, the invention relates to a transport unit for transporting goods which contains a transponder unit and a card likewise containing a transponder unit.

PRIOR ART

Transponder units in which in each case a transponder comprising an integrated circuit and an aerial loop is integrated, for example, in a card have long been known (cf. for example U.S. Pat. No. 5,800,763). In addition to the emission of signals by the transponder, an aerial winding serves for supplying energy to the integrated circuit when the transponder is read out by means of a reading device, by virtue of the fact that the magnetic component of an alternating electromagnetic field emitted by the latter induces in the aerial winding an alternating current which is rectified and is used, for example, for charging a capacitor. To ensure sufficient energy consumption even at a large reading distance and correspondingly low field strength, the area surrounded by the aerial winding should be as large as possible and its ohmic resistance as low as possible. A relatively large number of turns is in principle also advantageous for the energy consumption.

These requirements are difficult to fulfil. In particular, large windings having large numbers of turns are difficult to produce and cannot be produced on conventional machines and the corresponding transponders are large and inconvenient and their packaging and even more their encapsulation is complicated and expensive. Moreover, the number of turns is often limited or substantially determined by other requirements.

EP-B-0 657 836 proposed a transponder unit of the generic type, especially for identifying automobile tyres, in which, with a view to reducing the dependence of data transmission on the exact position of the reading device, a coupling circuit is provided which has a relatively large primary winding following the circumference of the tyre, while the secondary winding is relatively weakly inductively coupled with the aerial winding. When data is being read out from the transponder, the reading device is directly inductively coupled in particular to the primary winding, while the secondary winding produces the further coupling with the aerial winding of the transponder. Since, when the reading device is not too far away from the primary winding, its coupling therewith and hence with the transponder is sufficient for reading out, the spatial region over which the relative position of the reading device can vary is substantially greater than in the case of known transponder units without a coupling circuit, corresponding to the larger dimensions of the primary winding.

Since, however, the secondary winding is only weakly coupled with the aerial winding of the transponder, the transmission of energy from the reading device to the transponder is as a whole not optimum and sufficient energy consumption of the latter is ensured only in the case of relatively high field strengths, i.e. a short distance between the reading device and the primary winding.

SUMMARY OF THE INVENTION

It is the object of the invention to provide a transponder unit of the generic type in which sufficient energy uptake of the transponder is ensured even at low field strengths. This object is achieved by the features in the characterizing clause of claim 1.

In the transponder unit according to the invention, the secondary winding of the coupling circuit is coupled closely and in a specific manner to the aerial winding in such a way that the transponder takes up a relatively large amount of energy even at low field strengths, so that it operates reliably even at a large reading distance. Conversely, owing to the same highly effective coupling, the signals emitted by the transponder have a field strength sufficient for reliable response of the reader over a relatively wide spatial region. The mutual position of the transponder and of the reading device therefore have to be less accurately controlled.

This is relevant, for example, in the case of transport units according to the invention which comprise an integrated transponder unit according to the invention, where the transponder can also be read out at points which are relatively far away from the reading device. However, a transponder unit according to the invention can also advantageously be used in the case of cards, for example in credit card format. The aerial loop can be kept relatively small so that it can be easily produced or even integrated with the integrated circuit and the prefabricated transponder is compact and easy to encapsulate, while, by means of the coupling circuit which can be integrated in the card, energy uptake and signal output are substantially improved and the permissible reading distance is thus greater.

BRIEF DESCRIPTION OF THE DRAWINGS

The invention is explained in more detail below with reference to figures which show only embodiments.

DESCRIPTION OF THE PREFERRED EMBODIMENTS

Figure 1:
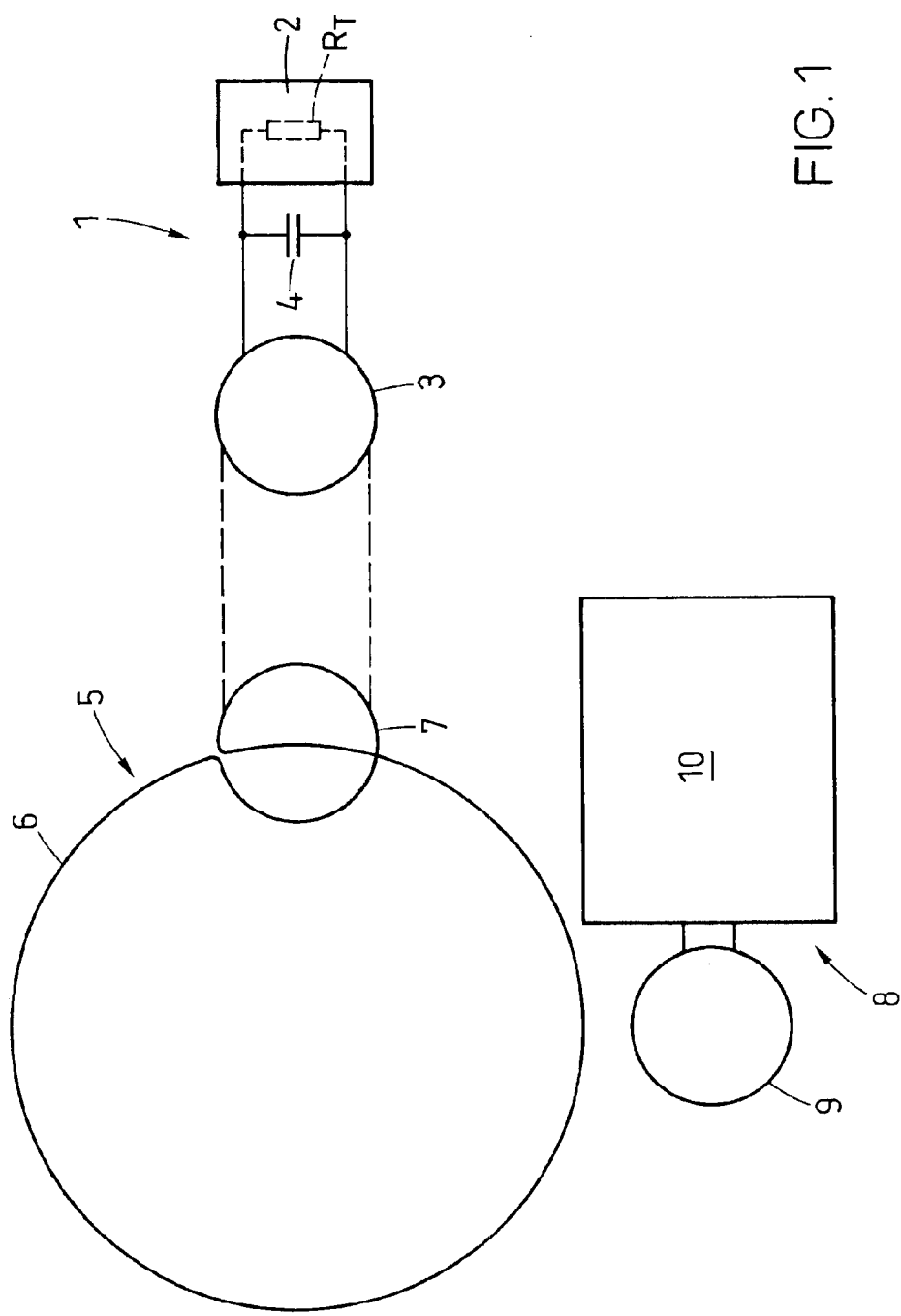
FIG. 1 schematically shows a transponder unit according to the invention which comprises a reading device.

The transponder unit comprises (FIG. 1) a transponder 1 of known type comprising an integrated circuit 2 having an internal resistance $R_T$ and an aerial winding 3 whose ends are connected to connections of the integrated circuit 2 to which a rectifier and a capacitor serving as an energy store are connected. The aerial winding 3 has an inductance $L_A$ and a resistance $R_A$. A capacitor 4 having a capacitance $C_A$ is moreover present between the connections of the integrated circuit 2. Furthermore, the integrated circuit 2 contains a nonvolatile digital memory for digital data, which serve for identifying an object connected to it, and a transmitting means likewise connected to the connections and by means of which the data can be coded and transmitted. The transponder 1 is as a rule encapsulated, for example in a suitable plastic housing or an ISO card.

A coupling circuit 5 electrically isolated from the transponder has a primary winding 6 and a secondary winding 7 in series with said primary winding, which windings together form a closed conductor loop arrangement. As will be shown in more detail later on, it is advantageous in many cases if the two windings each have only low self-inductances; moreover, a low resistance of the coupling circuit 5 is desirable. If there are no other design criteria to the contrary, it is therefore advantageous if the winding each have only one turn, especially since this also greatly simplifies the production. This is as a rule possible in the case of the primary winding, whereas the secondary winding often has to have a plurality of turns in the interest of sufficient coupling to the aerial winding of the transponder 1.

Preferably, the secondary winding 7 is wound in the opposite direction to the primary winding 6. The secondary winding 7 can moreover advantageously be arranged relative to the primary winding 6 in such a way that their mutual inductive coupling is close to zero. This can be the case, for example, if both are arranged substantially in a plane in such a way that the area surrounded by the secondary winding 7 partly overlaps the area surrounded by the primary winding 6 and partly overlaps the complement of this area, i.e. the region lying outside the primary winding 6.

The primary winding 6 can have a relatively large diameter of, for example, 300 mm or more, while the secondary winding 7 preferably has a diameter approximately corresponding to that of the aerial loop 3, for example about 50 mm. The exact dimensions and shapes of the windings are not decisive but the primary winding 6 should be substantially larger than the secondary winding 7 while the latter should correspond in shape and dimensions approximately to the aerial winding 3 in the immediate vicinity of which it is also mounted, and in such a way that the mutual induction of the secondary winding 7 and of the aerial winding 3 assumes, in the interest of optimum energy uptake of the transponder 1, a magnitude determined by a relationship explained and described further below.

A reading device 8 likewise has an aerial winding 9 which is connected to connections of a circuit 10. It contains a generator which generates an AC voltage $V_R$ having a frequency $\omega$ which is usually in the MHz range and corresponds to a receiving frequency of the transponder 1 and a receiver which receives and decodes signals emitted by the transponder and picked up by the aerial winding 8. The AC voltage $V_R$ causes a corresponding alternating current $I_R$ in the aerial winding 9.

Voltages and currents in the various circuits—of the aerial coil of the reading device, of the primary coil and of the secondary coil of the coupling circuit and the aerial circuit of the transponder—are then described by the following equations:

$$j\omega L_R I_R - j\omega(M_{RP} \pm M_{RS}) I_C - j\omega M_{RA} I_A = V_R \quad (1a)$$

$$-j\omega(M_{RP} \pm M_{RS}) I_R + j\omega(L_P L_S \pm 2M_{PS}) I_C - j\omega(M_{PA} \pm M_{SA}) I_A = 0 \quad (1b)$$

$$-j\omega M_{RA} I_R - j\omega(M_{PA} \pm M_{SA}) I_C + [R_A + j\omega L_A + R_T/(1+j\omega C_A R_T)] I_A = 0 \quad (1c)$$

± represents + if the direction of winding of the secondary winding 7 corresponds to that of the primary winding 6 and represents − if it is in the opposite direction. As mentioned, $V_R$ is the output voltage of the reading device 8 which is applied to the aerial coil 9 thereof and $L_X$ represents the inductance of the circuit X, with X=R the aerial winding 9 of the reading device 8 and with X=P,S,A the primary winding 6 and the secondary winding 7 of the coupling circuit 5 and the aerial winding 3 of the transponder 1, and correspondingly $I_X$ denotes the current in the circuit X with X=R,C,A, where C denotes the coupling circuit 5. As already mentioned, $R_A$ is the resistance of the aerial winding 3 of the transponder 1 and $R_T$ is the input resistance of the transponder circuit 2, and $C_A$ is the capacitance of the capacitor 4. $M_{SY}$ describes in each case the mutual inductance of the windings X,Y=R,P,S,A. The ohmic resistances of the coupling circuit 5 and of the aerial winding 9 of the reading device 8 are neglected in the equations. For $V_T$, the voltage which is decisive for the energy uptake of the transponder circuit 2 and is present at the input thereof, the following applies $$V_T = R_T/(1+j\omega C_A R_T) \times I_A \quad (2)$$

If the relatively small mutual inductances $M_{RA}$ and $M_{PA}$ are neglected (1a)–(1c) simplify to $$j\omega L_R I_R - j\omega(M_{RP} \pm M_{RS}) I_C = V_R \quad (3a)$$

$$-j\omega(M_{RP} \pm M_{RS}) I_R + j\omega(L_P + L_S \pm 2M_{PS}) I_C - j\omega(\pm M_{SA}) I_A = 0 \quad (3b)$$

$$-j\omega(\pm M_{SA}) I_C + [R_A + j\omega L_A + R_T/(1+j\omega C_A R_T)] I_A = 0 \quad (3c)$$

Neglecting $M_{RA}$ is not critical by the way since the direct coupling between the aerial winding 9 of the reading device 8 and the aerial winding 3 of the transponder 1 scarcely influences the optimization of the other parameters and even slightly improves the overall coupling. From (2), (3), the transfer function between the aerial winding 9 of the reading device 8 and the transponder circuit 2 is $$|V_T/I_R| = \omega |M_{RP} \pm M_{RS}| / \sqrt{\{(\omega^2 M_{SA} C_A - (L_P + L_S \pm M_{PS})/ \quad (4)}$$
$$M_{SA} \times (R_A/R_T - \omega^2 L_A C_A + 1)]^2 +$$
$$[\omega M_{SA}/R_T + (L_P + L_S \pm 2M_{PS})/$$
$$M_{SA} \times (\omega L_A/R_T + \omega C_A R_A)]^2\}$$

If it is assumed that the frequency $\omega$ approximately corresponds to the resonant frequency $\omega_r$ of the resonant circuit formed by the aerial winding 3 of the transponder 1 and the capacitor 4, i.e.

$$\omega^2 \approx \omega_r^2 = 1/(L_A C_A) \quad (5)$$

and the input resistance $R_T$ of the transponder circuit 2 is very large, the following is true to a good approximation $$|V_T/I_R| = |M_{RP} \pm M_{RS}|/\{C_A \sqrt{[\omega^2 M_{SA}^2 + (R_A/M_{SP})^2(L_P + L_S \pm 2M_{PS})^2]}\} \quad (6)$$

$|V_T/I_R|$ reaches a maximum at $$M_{SA} = \sqrt{[(R_A/\omega)(L_P + L_S \pm 2M_{PS})]} \quad (7)$$

The secondary winding 7 and the aerial winding 3 are designed and their mutual positions determined so that the relationship (7) is complied with as exactly as possible. Deviations from this relationship should be as small as possible and in any case $|V_T/I_R|$ should deviate from the maximum value by no more than a factor of $1/\sqrt{e}$ at most. The mutual coupling between the primary winding 6 and the secondary winding 7 should be as small as possible and should comply with the relationship $M_{PS} \leq (L_P + L_S)/100$.

Figure 2:
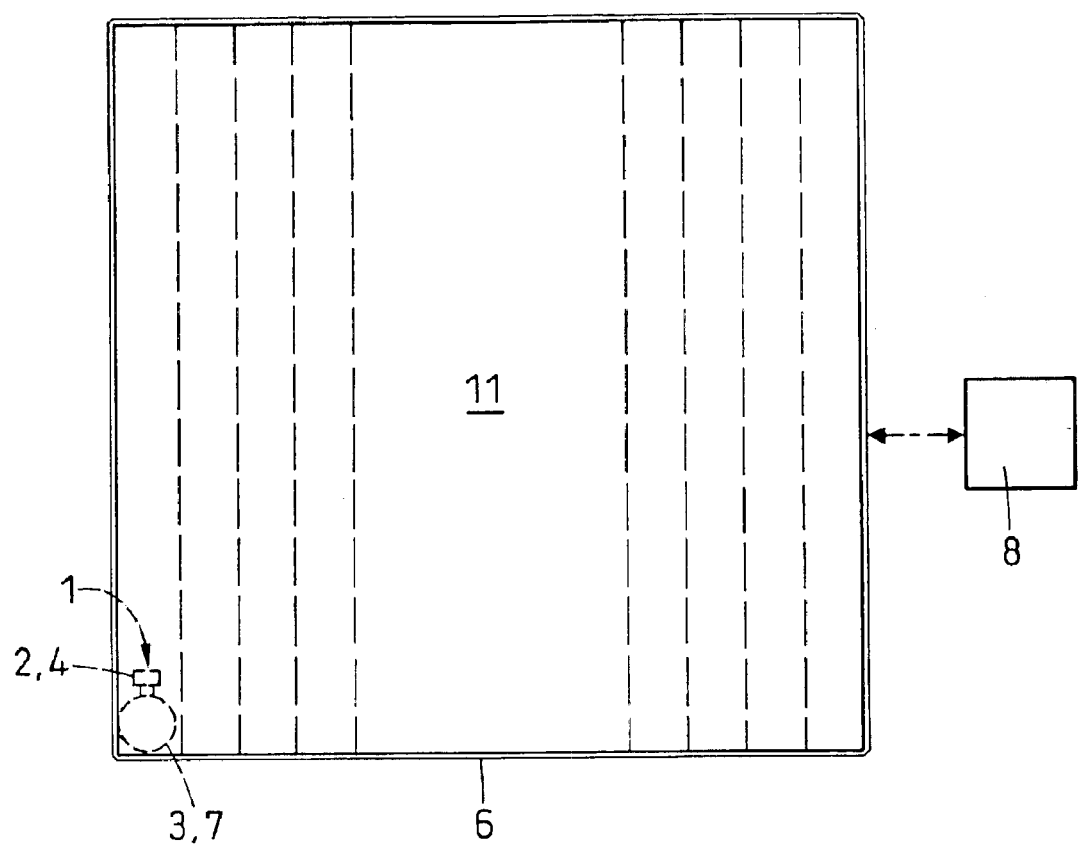
FIG. 2 shows a plan view of a transport unit according to the invention and FIG. 3 shows a plan view of a card according to the invention.

The transport unit according to the invention, shown in FIG. 2 and comprising a corresponding transponder unit described in principle in FIG. 1 is a Europallet, a standard pallet of wood having a plate 11 of approx. 0.8 m×1.2 m and a plurality of parallel base bars on the underside. The encapsulated transponder 1, consisting of the integrated circuit 2 with the capacitor 4 and the aerial winding 3, is integrated in a corner of the plate 11. The primary winding 6 of the coupling circuit is formed by a strip of steel or aluminium which surrounds the plate 11. The secondary loop 7 in series therewith is likewise integrated in the plate 11 and is coupled to the aerial winding 3 of the transponder 1 in such a way that the relationship (7) is complied with. As explained further above, the transponder 1 can be read out by a reading device 8 arranged in the vicinity of the primary winding 6, so that exact positioning of the transponder 1 relative to the reading device 8 is not required.

Figure 3:
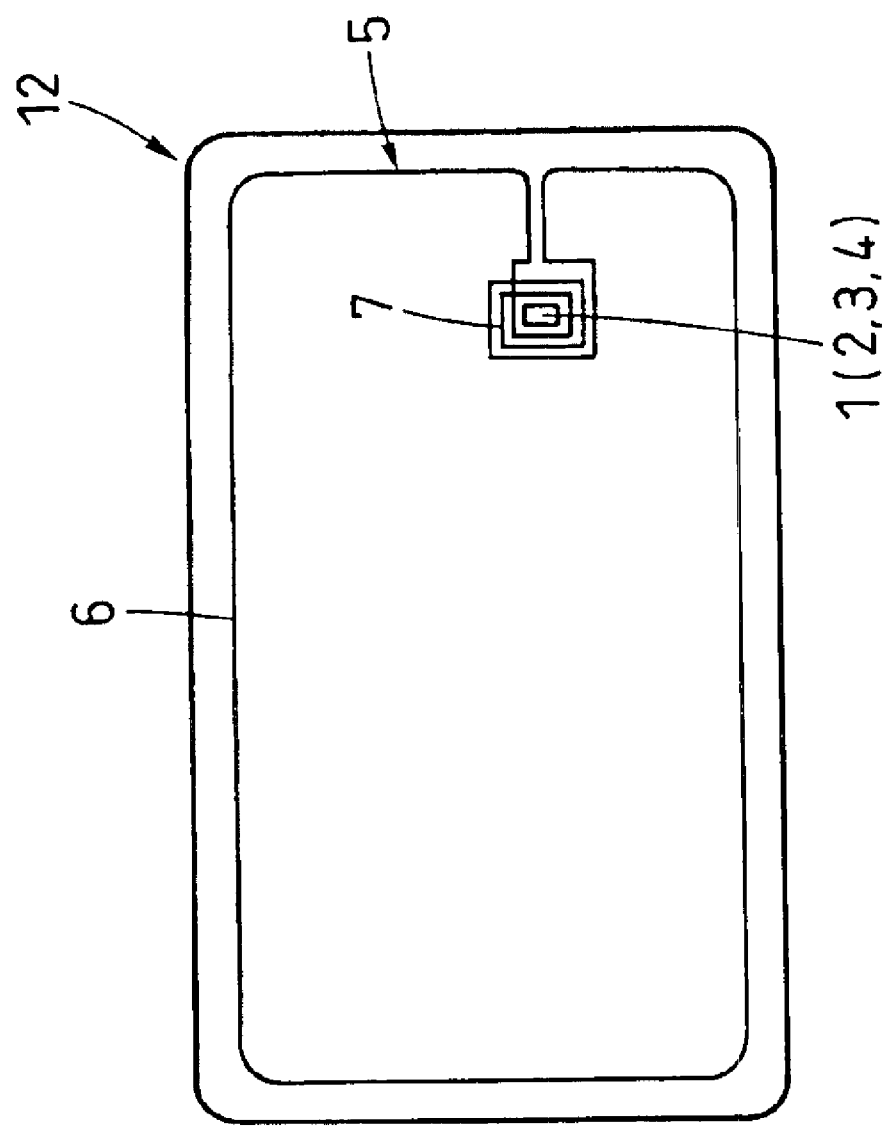

Solutions similar in principle are possible in many areas, but especially in the case of transport units for transporting a very wide range of goods. Thus, the primary winding can be formed by a ring or strip or the like encapsulated in a container or fastened to the outside or in the interior thereof, or by a coat hanger consisting wholly or partly of metal or by a metal strip which holds together a bale of any material. Preferably, the primary winding is formed in such a way that it substantially surrounds the transport unit, i.e. runs around its outside—though possibly sunk-in—so that its dimensions are utilized for producing as large an area as possible which is surrounded by the primary winding. In this way, bottles, buckets, containers, laundry items, bales of material, etc. can be identified by means of transponder units according to the invention and their circulation can be monitored relatively conveniently by means of reading devices. An encapsulated transponder 1 having a receiving frequency of 13.56 MHz is integrated in the card 12 which is shown in FIG. 3, consists of plastic and corresponds in format and design to a credit card or a cheque card. The aerial loop 3 integrated with the integrated circuit 2 is approximately square and has dimensions of 2.5 mm×2.5 mm and 60 turns. Its inductance $L_A$ is 6 $\mu$H and its resistance $R_A$ is 20 $\Omega$. The capacitor 4 likewise integrated with the integrated circuit 2 has a capacitance $C_A$ of 23 pF. The coupling circuit 5 is likewise integrated in the card 12. The primary coil 6 of the coupling circuit 5 follows approximately the edge of the card and has one turn of 80 mm×50 mm and its inductance $L_P$ is 240 nH. The secondary winding 7 wound in the opposite direction is present inside the primary winding 6 and surrounds the transponder 1. It consists of three turns having the dimensions 4 mm×4 mm and has an inductance $L_S$ of 65 nH. The mutual inductances are $M_{PS}$=0.7 nH, $M_{SA}$=189 nH and $M_{PA}$=3.5 nH. $M_{SA}$ corresponds exactly to the relationship (7).

The aerial coil of the reading device (not shown) is circular with a diameter of 100 mm and has five turns. An alternating current of $I_R \approx$100 mA whose frequency corresponds to the receiving frequency of 13.56 MHz flows through said aerial coil. Its inductance $L_R$ is 7 $\mu$H. The mutual inductances of the aerial coil of the reading device and of the other windings are $M_{RP}$=71 nH, $M_{RS}$=0.8 nH and $M_{RA}$=3.5 nH. With the stated electrical variables in a value for $|V_T/I_R|$ of 86.2 V/A results from (6). The permissible reading distance under these circumstances is approx. 50 mm.

Of course, transponder units according to the invention can also be directly fastened to products of all kinds, such as files, automobile tyres, etc., or integrated in them.

| List of reference symbols | |
|---|---|
| 1 | Transponder |
| 2 | Integrated circuit |
| 3 | Aerial winding |
| 4 | Capacitor |
| 5 | Coupling circuit |
| 6 | Primary winding |

| -continued | |
|---|---|
| List of reference symbols | |
| 7 | Secondary winding |
| 8 | Reading device |
| 9 | Aerial winding |
| 10 | Circuit |
| 11 | Plate |
| 12 | Card |

What is claimed is:

1. Transponder unit comprising:

a transponder having an aerial winding with first inductance $L_A$ and a resistance $R_A$ and having a capacitor parallel to said aerial winding and having a capacitance $C_A$; and a closed coupling circuit having a secondary winding with an inductance $L_S$, which is inductively coupled with the aerial winding and a primary winding of larger diameter with an inductance $L_P$, which is in series with the secondary winding and is inductively coupled with the secondary winding by a mutual inductance $M_{PS}$, wherein a mutual inductance $M_{SA}$ which couples the secondary winding to the aerial winding follows relationship $M_{SA}=[(R_A/\omega)(L_P+L_S\pm 2M_{PS})]$, where $\omega$ corresponds to a receiving frequency of the transponder and $\omega^2 \approx 1/(L_A C_A)$.

2. Transponder unit according to claim 1, wherein the mutual inductance of the primary winding and of the secondary winding and the inductances thereof satisfy relationship $M_{PS} \leq (L_P+L_S)/100$.

3. Transponder unit according to claim 1, wherein the primary winding and the secondary winding are arranged substantially in a plane and are wound in opposite directions, and wherein an area surrounded by the secondary winding partly overlaps an area surrounded by the primary winding.

4. Transponder unit according to claim 1, wherein the secondary winding has a larger number of turns than the primary winding.

5. Transponder unit according to claim 1, wherein the primary winding has only one turn.

6. Transponder unit according to claim 1, wherein a diameter of the aerial winding is not more than 150 mm.

7. Transponder unit according to claim 1, wherein the transponder is encapsulated in an encapsulation and the closed coupling circuit is arranged outside the encapsulation.

8. Transport unit comprising an integrated transponder unit according to claim 1, wherein the primary winding runs around an outside of the transport unit.

9. Transport unit according to claim 8, wherein the transport unit is one of a pallet, a container, a hangar, or a bale.

10. Card comprising an integrated transponder unit according to claim 1, wherein the transponder, including the aerial coil, is encapsulated and the closed coupling circuit is integrated in the card.

* * * * *